United States Patent

Shekleton

[11] Patent Number: 5,265,407
[45] Date of Patent: * Nov. 30, 1993

[54] OXIDANT BLOW DOWN HEATER

[75] Inventor: Jack R. Shekleton, San Diego, Calif.

[73] Assignee: Sundstrand Corporation, Rockford, Ill.

[*] Notice: The portion of the term of this patent subsequent to Dec. 10, 2008 has been disclaimed.

[21] Appl. No.: 542,421

[22] Filed: Jun. 22, 1990

[51] Int. Cl.⁵ ............... F02C 7/26; F02G 3/00
[52] U.S. Cl. ............... 60/39.02; 60/39.142; 60/260
[58] Field of Search ........... 60/39.02, 39.091, 39.142, 60/257, 259, 260

[56] References Cited

U.S. PATENT DOCUMENTS

| 550,831 | 12/1895 | Ladd . | |
| 693,871 | 2/1902 | Leavitt | 60/39.091 |
| 3,238,721 | 3/1966 | Brandes et al. | 60/39.142 |
| 3,736,749 | 6/1973 | Kretschmer et al. | 60/39.74 A |
| 4,161,102 | 7/1979 | Jasas et al. | 60/39.14 M |
| 4,777,793 | 10/1988 | Weigand et al. | 60/39.142 |
| 5,070,689 | 12/1991 | Vershure, Jr. et al. | 60/39.142 |

Primary Examiner—Richard A. Bertsch
Assistant Examiner—Howard R. Richman
Attorney, Agent, or Firm—Wood, Phillips, VanSanten, Hoffman & Ertel

[57] ABSTRACT

Difficulties in controlling the flow of oxidant to a combustor (10) in a stored energy system for driving a gas turbine (16) resulting from Joule-Thompson cooling of the oxidant are avoided in a system wherein a hot gas distributor (50, 50', 60) is disposed within an oxidant storage vessel (40, 60) to add heat to gases near the outlet (42) of the bottle (40, 60) as a result of the firing of a squib (54) in fluid communication therewith. The heating of the gases at the outlet (42) raises the temperature of the oxidant sufficiently to offset Joule-Thompson cooling.

15 Claims, 2 Drawing Sheets

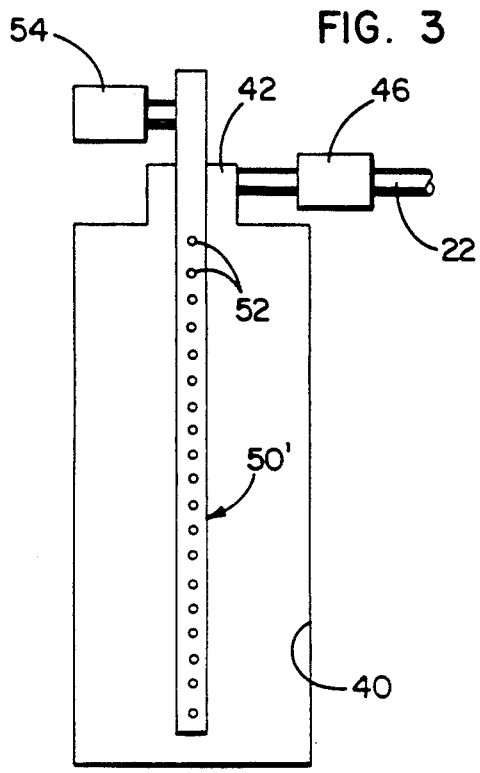
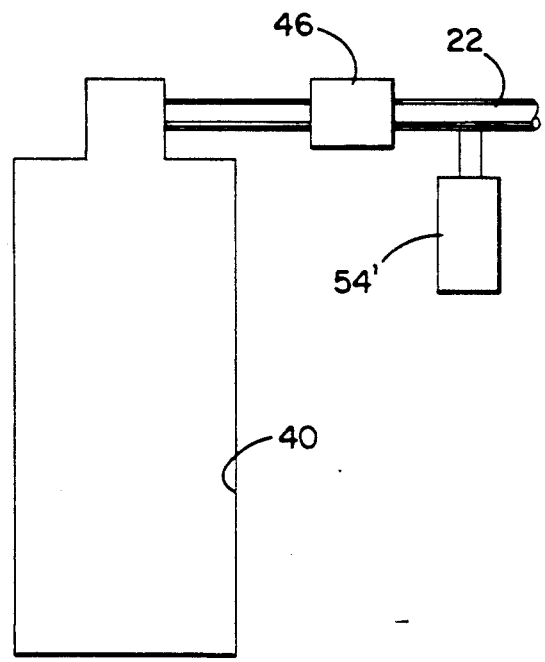
FIG. 4
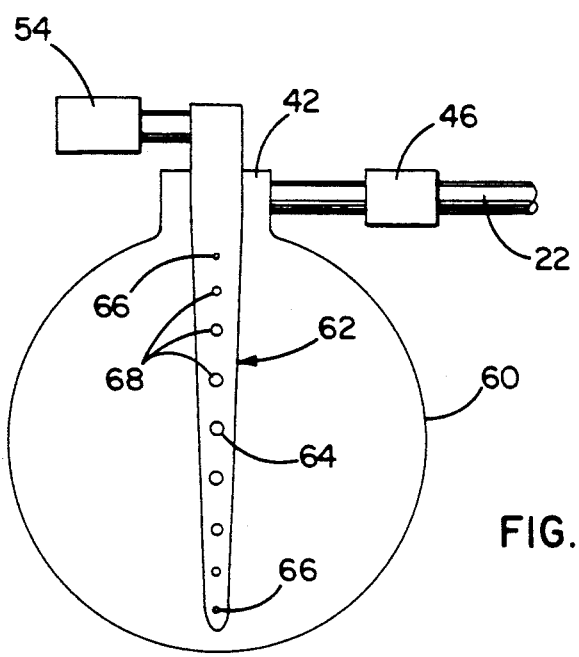
FIG. 5

5,265,407

OXIDANT BLOW DOWN HEATER

FIELD OF THE INVENTION

This invention relates to so-called stored energy systems wherein stored fuel and oxidant are combusted to provide motive gases to drive a turbine wheel as in starting or operating an auxiliary power unit or an emergency power unit.

BACKGROUND OF THE INVENTION

Both commercial and miliary aircraft typically carry an auxiliary power unit (APU) and often additionally may utilize a so-called emergency power unit (EPU). In some instances, the functions of both are combined.

In emergency systems, EPU's or APU's that operate additionally as EPU's must be brought into full operational capacity in a relatively short period of time, such as two or three seconds. In the usual case, these systems employ a turbine wheel for driving emergency power sources such as an electrical generator, hydraulic pump or both so as to provide the energy necessary to continue to operate the aircraft. Consequently, it is necessary that the turbine wheel be accelerated up to normal operating speed in a relatively short period of time so that if an APU is being utilized to provide emergency power, it can reach a self sustaining speed. Where an EPU is being utilized, it still must be accelerated rapidly and then its operation maintained for some predetermined time period.

Typically, these systems include a storage source for fuel and a high pressure storage vessel for oxidant which is utilized to combust the fuel. The oxidant may be air, oxygen enriched air, or even molecular oxygen.

Because of volume and weight constraints typically associated with aircraft, it is desirable to make the storage vessels as small and as lightweight as possible and that in turn means that it is desirable to hold oxidant requirements for a given emergency operation to a minimum. One way, of course, to minimize oxidant consumption, and thus the need for oxygen storage volume, is to control the flow of oxidant to a combustor where it is employed to combust fuel to provide motive gases for the turbine wheel, so as to provide only the amount of oxidant required to effect the desired combustion. Consequently, in an EPU, for example, it will be desirable to sense the power demand of the aircraft which is being placed on the turbine wheel of the EPU and regulate the flow of both fuel and oxidant appropriately.

Unfortunately, proper regulation of the flow of oxidant is not always easily achieved. Frequently, at extremely high altitudes, the oxidant storage vessel and flow control valves will be at extremely low temperatures that make operation of the valves and other flow regulating components difficult. The problem is exacerbated by the Joule-Thompson effect when an oxidant storage vessel is opened to initiate the flow of oxidant to the combustor. The Joule-Thompson effect causes an instantaneous drop in temperature of a gas as a result of the adiabatic expansion of that gas. Thus, when a valve controlling the outlet of a storage vessel in a stored energy system opens, the oxidant expands as it flows from the vessel. Consequently, in a bottle where an oxidant is stored at high pressure, say 5500 psi, the storage vessel may be at $-40°$ F. due to ambient conditions. Opening of the storage vessel will cause an instantaneous decrease in temperature to $-90°$ F. and at the end of the operational procedure, gas temperatures as low as minus 190° F. have actually been recorded. These conditions can make flow control unreliable.

The present invention is directed to solving one or more of the above problems.

SUMMARY OF THE INVENTION

It is the principal object of the invention to provide a new and improved stored energy system. More specifically, it is an object of the invention to provide a stored energy system which avoids problems caused by the Joule-Thompson effect. It is also an object of the invention to provide a method of initiating the operation of a gas turbine that avoid problems associated with the Joule-Thompson effect.

An exemplary embodiment of the invention, according to one facet thereof, achieves the foregoing object in a stored energy system for starting a gas turbine which includes an auxiliary combustor having a combustion gas outlet adapted to be connected to a gas turbine, a source of fuel to be combusted in the combustor, a storage bottle for storing a gaseous oxidant for the fuel under high pressure and having an outlet, means including flow controls interconnecting the bottle outlet and the combustor to provide for the controlled flow of oxidant to the combustor, and a squib for producing hot gases. Means are provided to interconnect the squib and the bottle for directing the hot gases to the interior of the bottle and include a hot gas distributor within the bottle for providing a desired distribution of the hot gases within at least part of the bottle to thereby warm the oxidant contained therein.

As a consequence of this, the cooling due to the Joule-Thompson effect is at least partially offset so that the flow controls may operate on gas at a temperature well above that which would result if no means were taken to cancel the effects of the Joule-Thompson effect.

In a preferred embodiment, the storage bottle includes an outlet and the gas distributor is disposed in adjacency to the outlet to add heat to the oxidant before it exits the outlet. In a highly preferred embodiment, the distributor provides the desired distribution of hot gases only at the outlet.

In another embodiment of the invention, the hot gas distributor is constructed and arranged to distribute hot gases to achieve substantial uniform heating of the oxidant within the storage vessel. In a highly preferred embodiment, the storage vessel is generally cylindrical and the hot gas distributor is a generally diametral conduit within the vessel. The conduit has a series of openings along its length with the openings nearest the center of the bottle being largest. The size of the openings progressively diminishes in the direction away from the center provide the uniform distribution.

In another embodiment of the invention, the bottle is generally cylindrical and the hot gas generator is an elongated conduit extending along the cylindrical axis of the bottle and having a series of generally equally sized openings therein.

Still another facet of the invention contemplates that the squib be located externally of the bottle and additionally includes a conduit connecting the squib and the hot gas generator.

Typically, where the hot gas distributor is a conduit, the conduit is mounted on the outlet of the bottle.

The invention also contemplates a method of starting a gas turbine which includes the steps of (a) flowing fuel to the combustor of the same, (b) flowing gaseous oxidant from a high pressure storage source to the combustor, and substantially simultaneously with the initiation of step (b), adding sufficient heat to the gaseous oxidant so as to prevent substantial Joule-Thompson cooling thereof.

Preferably, the step of adding sufficient heat is performed at the storage source, or, alternatively, may be performed on gaseous oxidant flowing between the storage source and the combustor.

In one embodiment, the high pressure storage source includes an outlet and the step of adding heat is performed within the source at least in close proximity to the outlet. Preferably, the step of adding heat is performed only at the outlet.

Another embodiment contemplates that the step of adding heat is performed throughout the source.

The invention also contemplates that the step of flowing gaseous oxidant to the combustor is performed using mechanical flow control devices located between the source and the combustor and that the step of adding heat is performed upstream of the combustor. Preferably, the step of adding heat is performed upstream of at least one of the mechanical flow devices. In still another embodiment of the invention, however, the step of performing heat of the step of adding heat may be performed downstream of one mechanical flow control device.

Other objects and advantages will become apparent from the following specification taken in connection with the accompanying drawings.

DESCRIPTION OF THE DRAWINGS

FIG. 3 is a fragmentary, somewhat schematic sectional view of a modified embodiment of the invention;

FIG. 4 is a view similar to FIG. 3 but of another embodiment of the invention;

FIG. 5 is a fragmentary schematic view of still another embodiment of the invention.

DESCRIPTION OF THE PREFERRED EMBODIMENTS

Figure 1:
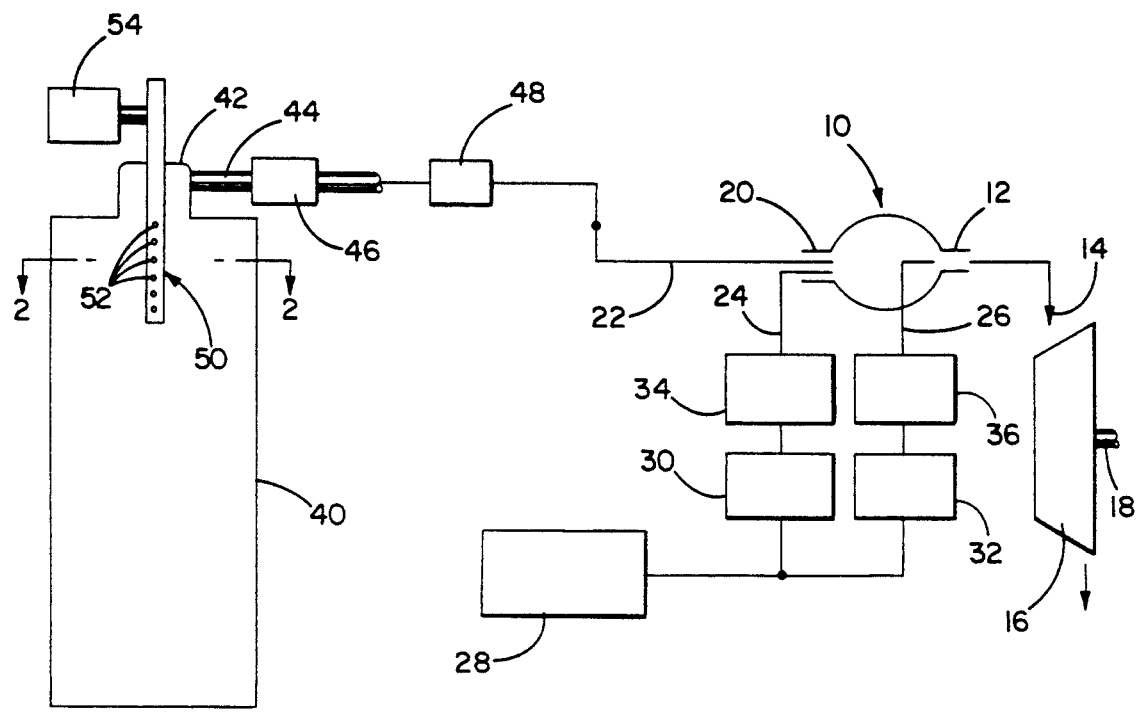
FIG. 1 is a schematic of a stored energy system made according to the invention.

An exemplary embodiment of a stored energy system made according to the invention is illustrated in FIG. 1 in the context of an EPU. However, it is to be understood that the invention may find utility in APU's as well and no limitation to one form or the other is intended except to the extent so stated in the claims appended hereto.

Referring to FIG. 1, an auxiliary combustor, generally designated 10, has an outlet 12 in fluid communication with a nozzle shown schematically at 14. The nozzle 14 is directed at a turbine wheel 16 mounted on a rotatable shaft 18. The shaft 18 will typically be connected via a suitable transmission to an auxiliary power source as, for example, electrical generators, hydraulic pumps, or both (not shown). Thus, when the turbine wheel 16 is driven by motive gases flowing from the nozzle 14, the auxiliary power sources will likewise be driven.

Opposite from the outlet 12, the combustor 10 includes an inlet 20 which receives an oxidant from, a conduit 22 as well as primary fuel from a conduit 24. Also included is a secondary fuel conduit 26 which terminates within the combustor just upstream of the outlet 12.

Fuel is maintained in a tank 28 and it's flow to either the conduit 24 or the conduit 26 is controlled by valves 30, 32, 34 and 36 The valves 30 and 32 are off/on valves while the valves 34 and 36 are typically servo valves for flow control. They are operated by conventional operating systems forming no part of the present invention. Thus, the valves 30 and 34 control whether or not the fuel is flowing to the conduit 24 and the rate of such flow while the valves 32 and 36 do the same for fuel flow in the conduit 26.

In operation, the fuel entering the combustor 10 through the conduit 24 is combusted with oxidant entering the combustor 10 through the conduit 22. Fuel entering the combustor 10 through the conduit 26 is vaporized and/or thermally cracked by the gases of combustion resulting from the burning of the fuel entering through the conduit 24. The fuel entering through the conduit 26 is not, however, appreciably combusted, if at all.

Control of the flow of fuel from the tank 24 to the combustor 10 is relatively easy because at worst, the various valves associated with the line are operating at the ambient temperature. The same cannot be said, however, for the flow of oxidant through the conduit 22.

More particularly, oxidant to the conduit 22 is supplied from a high pressure storage vessel such as a cylindrical bottle 40. Typically, oxidant may be stored within the bottle 40 at pressures in excess of 5000 pds. per sq. inch.

The bottle 40 includes an outlet neck 42 to which a part 44 of the conduit 22 is mounted so as to be in fluid communication with the interior of the bottle 40. An off/on valve 46 is located in the conduit 22 as is a servo controlled variable flow control valve 48. The valve 46 is opened to allow flow of oxidant from the bottle 40 and the flow rate to the combustor is controlled through modulation of the servo valve 48 in a known fashion.

As alluded to previously, the extremely low temperatures of gas exiting the bottle 40 may make proper operation of the valves 46 and 48, particularly the flow regulating ability of the valve 48, difficult. According to the invention, to prevent such cold gases from reaching the valves 46 and 48, heat is added to the oxidant within the vessel 40, which typically will be in gaseous form.

Figure 2:
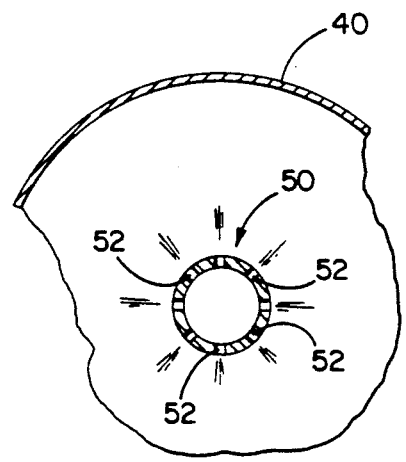
FIG. 2 is an enlarged, fragmentary sectional view taken approximately along the line 2—2 in FIG. 1.

More particularly, a heat distributor, generally designated 50, is disposed within the vessel 40 and immediately adjacent the outlet 42. In the embodiment illustrated in FIG. 2, the heat distributor 50 is in the form of a hot gas conduit mounted within the outlet and having a plurality of apertures 52 along its length as seen in FIG. 1 and about its circumference as seen in FIG. 2. A conventional squib 54 or incendiary device which may be basically on the order of a small solid fuel rocket is in fluid communication with the interior of the distributor 50 and is arranged to be fired simultaneously with the opening of the valve 46. As a consequence, when the valve 46 is opened, instantaneously, heat from the ignition of the incendiary device or squib 54 will be added to the oxidant within the bottle 40 immediately adjacent the outlet 44 as a result of hot gases flowing from the squib 54 and entering the bottle 40 through the openings 52 in the distributor 50. In this respect, in this embodiment, the apertures 52 are of equal size and are so spaced as to provide a substantially equal distribution of hot gas at the outlet 42 of the vessel 40. The hot gas entering the stored oxidant at this point raises the temperature of the later thereby offsetting the decrease in temperature caused by the Joule-Thompson effect.

FIG. 3 illustrates a modified embodiment of the invention wherein a hot gas distributor 50' extends virtually the entire length of the cylindrical bottle 40 along its cylindrical axis. In the case of this embodiment, there is uniform heating of the stored oxidant throughout a bottle 40.

FIG. 4 illustrates still another embodiment of the invention. In this embodiment, a spherical storage bottle 60 is utilized. A hot gas distributor conduit, generally designated 62, is located within the bottle 60, again being mounted in the outlet 42 therefore. The conduit 62 extends diametrically within the bottle 60 and may have a tapered configuration as is illustrated in FIG. 4, growing progressively smaller as the outlet 42 become more remote to thereby be sized appropriately for the flow of gas. In the embodiment illustrated in FIG. 4, to achieve uniform distribution of the hot gases generated by the squib 54 throughout the bottle 60, central openings 64 (only one of which is shown) in the distributor 62 are the largest while the openings 66 most remote from the center opening 64 are the smallest. The intermediate openings 68 become progressively smaller as one progresses from the center openings 64 towards either set of the remote openings 66. The exact sizing of the openings 64, 68 and 66 can be determined in proportion to the volume of a segment of a sphere defined by two parallel planes sandwiching the corresponding opening.

In some instances, where there may be concern that communicating the hot gases generated upon ignition of the squib 54 to the interior of a bottle may increase the pressure within the bottle 40 to undesirable limits, the embodiment illustrated in FIG. 5 may be employed. In this embodiment, the squib 54' is connected to the conduit 22' just downstream of the off/on valve 46. Thus, only the off/on valve 46 will be subject to the extremely low temperatures while all other flow control components associated with the line 22' will receive gas to which heat has been added.

From the foregoing, it will be appreciated that a stored energy system made according to the invention eliminates the oxidant flow regulating difficulties resulting from the Joule-Thompson effect. Of the various embodiments, that shown in FIG. 1 is perhaps most appreciated in that, by adding heat only near the outlet from the bottle, a minimum increase in internal pressure within the bottle 40 as a result of ignition of the squib 54 is required and yet all gas exiting the bottle is appropriately heated. The embodiment illustrated in FIG. 5 has the advantage that it does not increase the internal pressure within the bottle 40 when the squib 54' is ignited. At the same time, it does not isolate the on/off valve 46 from the effects of Joule-Thompson cooling of the gas.

The embodiments of FIGS. 1-4, inclusive have an additional advantage in that the pressurizing of the interiors of the storage bottles as a result of operation of the squib 54 results in an increase in the motive force (due to pressure differential) operative to drive oxidant from the interior of the bottle to the combustor 10 allowing virtually the entire volume of oxidant to be employed. In all events, combustion inefficiency due to low temperature of the oxidant, the resulting wastage of oxidant and destructive build up of carbon in the combustor 10 that may result from poor combustion efficiency, difficulties resulting from the formation of ice which plugs controls and fuel injector orifices, freezing of fuel as a result of conduction of heat from the fuel conduit 24 to the oxidant conduit 22 at the inlet 20 of the combustor, malfunction of the valves 46 and 48, ignition problems etc. are all eliminated in a stored energy system made according to the invention.

I claim:

1. A stored energy system for use in starting a gas turbine comprising:

an auxiliary combustor having a combustion gas outlet adapted to be connected to a gas turbine;

a source of fuel to be combusted in said combustor;

a storage vessel for storing an oxidant for the fuel under pressure, said storage vessel being generally spherical;

means, including flow controls, interconnecting said vessel and said combustor to provide for the controlled flow of oxidant to the combustor;

a squib for producing hot gases; and means interconnecting said squib and said vessel for directing the hot gases to the interior of said vessel and including a hot gas distributor within said vessel for providing a desired distribution of the hot gases within at least part of said vessel to thereby heat the oxidant contained therein, and being constructed and arranged to distribute hot gases to achieve substantially uniform heating of oxidant in said vessel, said hot gas distributor being a generally diametral conduit within said vessel and having a series of openings along its length, the openings nearest the center of the vessel being largest with the openings progressively diminishing in size in the directions away from said center.

2. A stored energy system for use in starting a gas turbine comprising:

an auxiliary combustor having a combustion gas outlet adapted to be connected to a gas turbine;

a source of fuel to be combusted in said combustor;

a generally cylindrical storage bottle for storing an oxidant for the fuel under high pressure;

means, including flow controls, interconnecting said bottle and said combustor to provide for the controlled flow of oxidant to the combustor;

a squib for producing hot gases; and means interconnecting said squib and said bottle for directing the hot gases to the interior of said bottle and including a hot gas distributor within said bottle for providing a desired distribution of the hot gases within at least part of said bottle to thereby heat the oxidant contained therein, and being constructed and arranged to distribute hot gases to achieve substantially uniform heating of oxidant in said storage bottom, said hot gas distributor being an elongated conduit extending along the cylindrical axis of said bottle and having a series of generally equally sized openings therein.

3. A stored energy system for use in starting a gas turbine comprising:

an auxiliary combustor having a combustion gas outlet adapted to be connected to a gas turbine;

a source of fuel to be combusted in said combustor;

a storage bottle for storing an oxidant for the fuel under high pressure;

means, including flow controls, interconnecting said bottle and said combustor to provide for the controlled flow of oxidant to the combustor;

a squib for producing hot gases, said squib being located externally of said bottle and further including a conduit connecting said squib and said bottle; and means interconnecting said squib and said bottle for directing the hot gases to the interior of said bottle and including a hot gas distributor within said bottle for providing a desired distribution of the hot gases within at least part of said bottle to thereby heat the oxidant contained therein.

4. A stored energy system for use in starting a gas turbine comprising:

an auxiliary combustor having a combustion gas outlet adapted to be connected to a gas turbine;

a source of fuel to be combusted in said combustor;

a storage bottle for storing an oxidant for the fuel under high pressure, and including an outlet;

means, including flow controls, interconnecting said bottle and said combustor to provide for the controlled flow of oxidant to the combustor;

a squib for producing hot gases; and means interconnecting said squib and said bottle for directing the hot gases to the interior of said bottle and including a hot gas generator within said bottle for providing a desired distribution of the hot gases within at least part of said bottle to thereby heat the oxidant contained therein, said hot gas generator being disposed in adjacency to said outlet to add heat to the oxidant before it exits said outlet and being a conduit disposed within said bottle and having a series of openings only in the vicinity of said outlet.

5. The stored energy system of claim 4 wherein said conduit is mounted on said outlet.

6. The stored energy system of claim 5 wherein said conduit extends only partly into said bottle.

7. A method of starting a gas turbine utilizing an combustor comprising the steps of:

a) flowing fuel to the combustor;

b) flowing gaseous oxidant from a high pressure storage source to the combustor; and c) substantially simultaneously with the initiation of step (b) adding sufficient heat to the gaseous oxidant to prevent substantial Joule-Thompson cooling thereof.

8. The method of claim 7 wherein step (c) is preformed at the storage source.

9. The method of claim 7 wherein step (c) is performed on gaseous oxidant flowing between the storage source and the combustor.

10. The method of claim 7 wherein said high pressure storage source includes an outlet and step (c) is performed within said source at least in close proximity to said outlet.

11. The method of claim 10 wherein step (c) is performed only at said outlet.

12. The method of claim 10 wherein step (c) is performed throughout said source.

13. The method of claim 7 wherein step (b) is performed using mechanical flow control devices between said source and said combustor and step (c) is performed upstream of said combustor.

14. The method of claim 13 wherein step (c) is performed upstream of at least one mechanical flow control device.

15. The method of claim 13 wherein step (c) is performed downstream of at least one mechanical flow control device.

* * * * *